United States Patent
Huang et al.

(10) Patent No.: US 12,216,218 B2
(45) Date of Patent: Feb. 4, 2025

(54) POSITIONING METHOD AND APPARATUS

(71) Applicant: HUAWEI TECHNOLOGIES CO., LTD., Guangdong (CN)

(72) Inventors: Jingsong Huang, Wuhan (CN); Rui Yuan, Wuhan (CN); Yangbo Lin, Shenzhen (CN); Yi Zhang, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 293 days.

(21) Appl. No.: 17/837,605

(22) Filed: Jun. 10, 2022

(65) Prior Publication Data
US 2022/0350035 A1 Nov. 3, 2022

Related U.S. Application Data

(63) Continuation of application No. 16/460,895, filed on Jul. 2, 2019, now abandoned, which is a continuation
(Continued)

(30) Foreign Application Priority Data

Jan. 3, 2017 (CN) .......................... 201710001235.6

(51) Int. Cl.
*G01S 19/44* (2010.01)
*G01S 19/04* (2010.01)

(52) U.S. Cl.
CPC .............. *G01S 19/44* (2013.01); *G01S 19/04* (2013.01)

(58) Field of Classification Search
CPC ................................ G01S 19/44; G01S 19/04
(Continued)

(56) References Cited

U.S. PATENT DOCUMENTS 6,799,116 B2 * 9/2004 Robbins ................. G01S 5/009
73/178 R
7,656,352 B2 2/2010 Alban et al.
(Continued)

FOREIGN PATENT DOCUMENTS

CN 101770033 A 7/2010
CN 101943749 A 1/2011
(Continued)

OTHER PUBLICATIONS

Ublox. "GPS Essentials of Satellite Navigation—Compendium." www.u-blox.com. GPS-X-02007-D. pp. 1-17 4. (Year: 2009).
(Continued)

*Primary Examiner* — Bo Fan
(74) *Attorney, Agent, or Firm* — WOMBLE BOND DICKINSON (US) LLP

(57) ABSTRACT

Embodiments of this application provide a positioning method and apparatus. The method may include setting an ambiguity adjustment parameter for a mobile device, where the ambiguity adjustment parameter is used to record an ambiguity change status used to determine a virtual station observation value for the mobile device. The method may also include adjusting an observation value of a first primary datum station based on a first ambiguity adjustment parameter of the mobile device in a first serving cell to generate a first virtual station observation value, where the first primary datum station is a primary datum station of the first serving cell, and the first virtual station observation value is used to position the mobile device in the first serving cell; and sending the first virtual station observation value to the mobile device.

13 Claims, 6 Drawing Sheets

Related U.S. Application Data of application No. PCT/CN2017/116313, filed on Dec. 15, 2017.

(58) Field of Classification Search
USPC ............... 342/357.44, 357.45, 357.27, 352
See application file for complete search history.

(56) References Cited

U.S. PATENT DOCUMENTS

| | | | | |
|---|---|---|---|---|
| 8,803,735 | B2* | 8/2014 | McClure | G01S 19/13 |
| | | | | 342/357.44 |
| 2005/0064878 | A1* | 3/2005 | O'Meagher | G01S 5/0063 |
| | | | | 455/456.2 |
| 2006/0267838 | A1 | 11/2006 | Bird | |
| 2009/0093959 | A1 | 4/2009 | Scherzinger et al. | |
| 2010/0079333 | A1 | 4/2010 | Janky et al. | |
| 2010/0090890 | A1* | 4/2010 | Wirola | G01S 19/04 |
| | | | | 342/357.44 |
| 2011/0285586 | A1* | 11/2011 | Ferguson | G01S 19/04 |
| | | | | 342/357.45 |
| 2014/0043187 | A1* | 2/2014 | Ellum | G01S 19/04 |
| | | | | 342/357.27 |
| 2016/0116601 | A1* | 4/2016 | Horn | G01S 19/51 |
| | | | | 342/357.27 |

FOREIGN PATENT DOCUMENTS

| | | |
|---|---|---|
| CN | 201716420 U | 1/2011 |
| CN | 102298151 A | 12/2011 |
| CN | 102859390 A | 1/2013 |
| CN | 103176188 A | 6/2013 |
| CN | 102761961 B | 2/2015 |
| CN | 102739301 B | 5/2015 |
| CN | 108351422 B | 2/2020 |
| CN | 108353246 B | 8/2020 |
| EP | 2759849 A1 | 7/2014 |
| JP | 2005172738 A | 6/2005 |
| JP | 2005189059 A | 7/2005 |
| JP | 2016012912 A | 1/2016 |
| JP | 2017133896 A | 8/2017 |
| KR | 20090035390 A | 4/2009 |
| KR | 20090071783 A | 7/2009 |
| KR | 20140100641 A | 8/2014 |
| KR | 20160017216 A | 2/2016 |
| WO | 2017070909 A1 | 5/2017 |

OTHER PUBLICATIONS

3GPP TR 22.891 V0.2.0 (Aug. 2015), 3rd Generation Partnership Project;Technical Specification Group Services and System Aspects; Feasibility Study on New Services and Markets Technology Enablers; Stage 1 (Release 14), 61-152336, Aug. 2015. total 73 pages.
Rachid El Hattachi, Javan Erfanian:"NGMN 5G White Paper v1 .O" By NGMN Alliance, Feb. 17, 2015, total 125 pages.
Katsutoshi Kusume:"ICT-317669-METIS/01 .5", METIS_D1 .5_v1, Updated scenarios, requirements and KPIs for 5G mobile and wireless system with recommendations for future investigations, May O 1, 2015. total 57 pages.
3GPP TR 22.891 V14.2.0 (Sep. 2016),3rd Generation Partnership Project; Technical Specification Group Services and System Aspects; Feasibility Study on New Services and Markets Technology Enablers; Stage 1 (Release 14), Sep. 2016. total 95 pages.
ZTE Corporation:"Proposal for high accuracy positioning use case", 3GPP TSG-SA WG1 Meeting #71, S1-152724, Belgrade, Serbia, Aug. 17-21, 2015. total 4 pages.
Huawei et al. Use case for connected vehicles, 3GPP TSG-SA WG1 Meeting #71, S1-152708, Belgrade, Serbia, Aug. 17-21, 2015. total 2 pages.
Orange:"Connectivity for drones", 3GPP TSG-SA WG1 Meeting #70, S1-151564, Los Cabos, Mexico, Apr. 13-17, 2015, total 2 pages.
Catt et al.:"SMARTER: Use case family for Low latency and reliable communication—Remote Control", 3GPP TSG-SA WG1 Meeting #70, S1-151571, Los Cabos, Mexico, Apr. 13-17, 2015, total 2 pages.
Nokia Networks:"Proposed new FS_SMARTER use case on Industrial Control", 3GPP TSG-SA WG1 Meeting #70, 51-151565, Los Cabos, Mexico, Apr. 13-17, 2015, total 2 pages.
New:"Enhancing Location Capabilities for Indoor and Outdoor Emergency Communications", 3GPP TSG-SA WG1 Meeting #69 S1-150065, Sanya, P.R. China, Feb. 2-6, 2015, total 6 pages.
ZTE Corporation:"Modification Higher accuracy positioning family in section 6.2", 3GPP TSG-SA WG1 Meeting #72 S1-154168, Anaheim, CA, USA, Nov. 16-20, 2015, total 2 pages.
LG Electronics:"Some clarification on the Use Case of Connected Vehicles", 3GPP TSG-SA WG1 Meeting #72 S1-154244, Anaheim, CA, USA, Nov. 16-20, 2015, total 3 pages.
He Li-heng et al. A Comparison of Different Communication RTK Survey Systems, 2011 IEEE. Total 4 pages.
Cina A., et al. Augmented Positioning with CORSs Network Services Using GNSS Mass-market Receivers, IEEE 2014. pp. 359-366.
Zou Xuan et al. Method of Network RTK Based on Undifferenced Observation Corrections and its Functional Realization in Cross-CORS Service, Acta Geodatica et Cartographica Sinica, vol. 40. Sup. May 2011. total 5 pages. With English abstract.
Weiguang Gao et al.Summarizing on development of GNSS diferenlial technology, Science of Surveying and Mapping, vol. 38 No. 1. Jan. 2013. total 4 pages. with English abstract.
Ji Changfei el al. Error Analysis and Modeling Based on VRS Technology, China Waler Transport (Academic Edition), 2007. total 3 pages. with English abstract.

\* cited by examiner

200

| Receive a first virtual station observation value sent by a service center, where the first virtual station observation value is generated by adjusting an observation value of a first primary base station based on a first ambiguity adjustment parameter value of a mobile device in a first serving cell, and the first primary base station is a primary base station of the first serving cell | ~ S210 |

| Position the mobile device based on the first virtual station observation value | ~ S220 |

FIG. 4

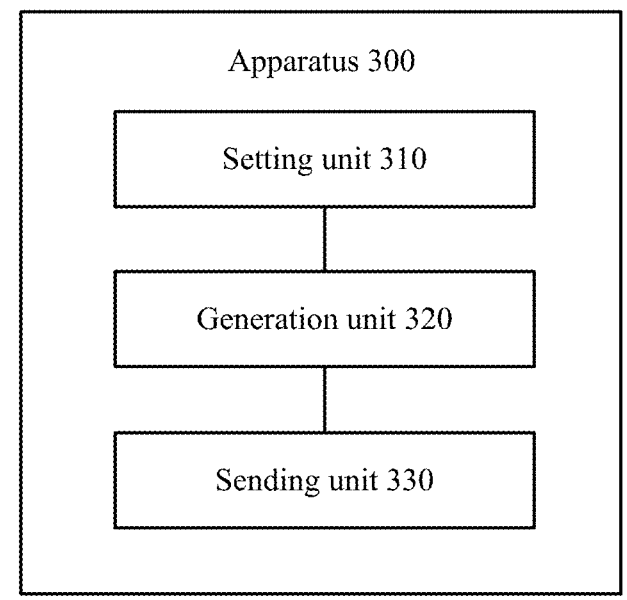

FIG. 5

POSITIONING METHOD AND APPARATUS

CROSS-REFERENCE TO RELATED APPLICATIONS

This application is a continuation of U.S. patent application Ser. No. 16/460,895, filed on Jul. 2, 2019, which is a continuation of International Application No. PCT/CN2017/116313, filed on Dec. 15, 2017. The International Application claims priority to Chinese Patent Application No. 201710001235.6, filed on Jan. 3, 2017. All of the aforementioned patent applications are hereby incorporated by reference in their entireties.

TECHNICAL FIELD

Embodiments of this application relate to the satellite positioning field, and more specifically, to a positioning method and apparatus.

BACKGROUND

In Network Real Time Kinematic (NRTK), several (usually at least three) fixed observation stations (referred to as datum stations/reference stations) are evenly and sparsely arranged in a relatively wide area, so as to form a datum station network that covers an area, and one or more of the datum stations are used as a reference, to provide network differential information for a user in real time, so as to correct an error in a positioning apparatus such as the Global Positioning System (GPS) or Beidou of a user, and implement high-precision positioning.

Traditionally, the network RTK is mainly used for static positioning, and service interruption rarely occurs. With rapid development of intelligent driving technologies, the network RTK needs to be used for dynamic positioning. How to ensure positioning service continuity in dynamic positioning is a problem to be urgently resolved in current dynamic positioning.

SUMMARY

In view of this, embodiments of this application provide a positioning method and apparatus, so as to ensure positioning service continuity.

According to a first aspect, a positioning method is provided, and the method includes: setting an ambiguity adjustment parameter for a mobile device, where the ambiguity adjustment parameter is used to record an ambiguity change status used to determine a virtual station observation value for the mobile device; adjusting an observation value of a first primary datum station based on a first ambiguity adjustment parameter of the mobile device in a first serving cell, so as to generate a first virtual station observation value, where the first primary datum station is a primary datum station of the first serving cell, and the first virtual station observation value is used to position the mobile device in the first serving cell; and sending the first virtual station observation value to the mobile device.

Each mobile device has one ambiguity adjustment parameter, and the mobile device has different ambiguity adjustment parameters in different cells.

The ambiguity adjustment parameter is set for the mobile device, and observation values of primary datum stations of different cells are adjusted based on ambiguity adjustment parameters of the mobile device in different cells, so that positioning service continuity can be ensured.

In a possible embodiment, before the adjusting an observation value of a first primary datum station based on a first ambiguity adjustment parameter of the mobile device in a first serving cell, so as to generate a first virtual station observation value, the method further includes: determining that the first primary datum station that provides a positioning service for the mobile device is the first primary datum station, where the first primary datum station is the first primary datum station of a network accessed by the mobile device; and determining that the first ambiguity adjustment parameter is an initial value.

The initial value is an initial value assigned to the ambiguity adjustment parameter when the mobile device first accesses a network. The initial value may be 0, or may not be 0.

In a possible embodiment, before the adjusting an observation value of a first primary datum station based on a first ambiguity adjustment parameter of the mobile device in a first serving cell, so as to generate a first virtual station observation value, the method further includes: determining that a primary datum station that provides a positioning service for the mobile device switches from a second primary datum station to the first primary datum station; obtaining an ambiguity difference between the first primary datum station and the second primary datum station; and updating the ambiguity adjustment parameter to the first ambiguity adjustment parameter based on the ambiguity difference, where the first ambiguity adjustment parameter is obtained by summing up a second ambiguity adjustment parameter of the mobile device in a second serving cell and the ambiguity difference, and the second primary datum station is a primary datum station of the second serving cell.

When the mobile device performs continuous motion, an observation value that is of a primary datum station and that is used to position the mobile device in a next cell is modified by using an ambiguity adjustment parameter obtained by summing up ambiguity differences between a plurality of continuous cells that are before the mobile device crosses to the next cell, so as to ensure continuous positioning when the mobile device frequently crosses cells.

In a possible embodiment, the determining that a primary datum station that provides a positioning service for the mobile device switches from a second primary datum station to the first primary datum station includes: receiving first position information that is of the mobile device at a current moment and that is sent by the mobile device and second position information that is of the mobile device at a first moment and that is determined and sent by the mobile device, where the first moment is after the current moment; and determining, based on the first position information and the second position information, that the primary datum station that provides the positioning service for the mobile device switches from the second primary datum station to the first primary datum station.

The mobile device independently predicts position information that is after a period of time, increasing accuracy and flexibility.

In a possible embodiment, the determining that a primary datum station that provides a positioning service for the mobile device switches from a second primary datum station to the first primary datum station includes: receiving first position information that is of the mobile device at a current moment and that is sent by the mobile device and speed information and direction information that are of the mobile device at the current moment and that are sent by the mobile device; determining second position information of the mobile device at a first moment based on the first position information, the speed information, and the direction information, where the first moment is after the current moment; and determining, based on the first position information and the second position information, that the primary datum station that provides the positioning service for the mobile device switches from the second primary datum station to the first primary datum station.

Position information of the mobile device after a period of time may be predicted based on current position information, current speed information, and current direction information that are sent by the mobile device, so as to determine whether the mobile device crosses a cell.

In a possible embodiment, the obtaining an ambiguity difference between the first primary datum station and the second primary datum station includes: obtaining the ambiguity difference through vector calculation based on an ambiguity parameter of a known baseline in a datum station network, where the datum station network is a Delaunay triangulation network including a plurality of datum stations on a two-dimensional plane, and the known baseline forms a shortest path from the first primary datum station to the second primary datum station in the datum station network.

Only ambiguity parameters of baselines in two adjacent cells are used, and no other cells are related. A calculation process is simple, and it is applicable to distributed processing of a large-scale datum station network.

In a possible embodiment, the method further includes: sending a second virtual station observation value to the mobile device, where the second virtual station observation value is generated by adjusting an observation value of the second primary datum station based on the second ambiguity adjustment parameter.

Two virtual station observation values used in two adjacent cells are sent to the mobile device, so that the mobile device can switch a virtual station observation value more accurately.

According to a second aspect, a positioning method is provided, and the method includes: receiving a first virtual station observation value sent by a service center, where the first virtual station observation value is generated by adjusting an observation value of a first primary datum station based on a first ambiguity adjustment parameter of a mobile device in a first serving cell, and the first primary datum station is a primary datum station of the first serving cell; and positioning the mobile device based on the first virtual station observation value.

Positioning is performed based on an observation value that is of a primary datum station and that is modified based on an ambiguity adjustment parameter, so that positioning continuity can be ensured.

In a possible embodiment, the first ambiguity adjustment parameter is obtained by summing up a second ambiguity adjustment parameter of the mobile device in a second serving cell and an ambiguity difference between the first primary datum station and a second primary datum station, the second primary datum station is a primary datum station of the second serving cell, and before the receiving a first virtual station observation value sent by a service center, the method further includes: sending first information to the service center, where the first information is used by the service center to determine that a primary datum station that provides a positioning service for the mobile device switches from the first primary datum station to the second primary datum station.

Information for determining switching of the primary datum station that provides the positioning service for the mobile device is sent to the service center, so that the service center modifies the observation value of the primary datum station based on ambiguity differences between primary datum stations of a plurality of cells that are before cell crossing. This can resolve a problem that positioning of the mobile device is interrupted during cell crossing, and this is simpler and more easily implemented in comparison with a method for processing all ambiguity differences between primary datum stations.

In a possible embodiment, the first information includes first position information and second position information, and before the sending first information to the service center, the method further includes: obtaining the first position information of the mobile device at a current moment and speed information and direction information of the mobile device at the current moment; and determining the second position information of the mobile device at a first moment based on the first position information, the speed information, and the direction information, where the first moment is after the current moment.

The mobile device independently predicts position information that is after a period of time, increasing accuracy and flexibility.

In a possible embodiment, the first information includes first position information of the mobile device at a current moment and speed information and direction information of the mobile device at the current moment.

In a possible embodiment, the method further includes: receiving a second virtual station observation value sent by the service center, where the second virtual station observation value is obtained by adjusting an observation value of the second primary datum station/reference station based on the second ambiguity adjustment parameter; and when the mobile device moves from the second serving cell to the first serving cell, switching a virtual station observation value used to position the mobile device from the second virtual station observation value to the first virtual station observation value.

According to a third aspect, an apparatus is provided, configured to perform the method in any one of the first aspect or the possible embodiments of the first aspect. Specifically, the apparatus includes units configured to perform the method in any one of the first aspect or the possible embodiments of the first aspect.

According to a fourth aspect, an apparatus is provided, configured to perform the method in any one of the second aspect or the possible embodiments of the second aspect. Specifically, the apparatus includes units configured to perform the method in any one of the second aspect or the possible embodiments of the second aspect.

According to a fifth aspect, an apparatus is provided, and the apparatus includes a processor, a memory, and a transceiver. The memory, the processor, and the transceiver are connected by using communication connections. The memory is configured to store an instruction, and the processor is configured to execute the instruction stored in the memory. When the instruction is executed, the processor performs the method in the first aspect, and controls the transceiver to receive input data and information and output data such as an operation result.

According to a sixth aspect, an apparatus is provided, and the apparatus includes a processor, a memory, and a transceiver. The memory, the processor, and the transceiver are connected by using communication connections. The memory is configured to store an instruction, and the processor is configured to execute the instruction stored in the memory. When the instruction is executed, the processor performs the method in the second aspect, and controls the transceiver to receive input data and information and output data such as an operation result.

According to a seventh aspect, a computer storage medium is provided, configured to store a computer software instruction used in the foregoing method, and the computer storage medium includes a program designed for performing the first aspect.

According to an eighth aspect, a computer storage medium is provided, configured to store a computer software instruction used in the foregoing method, and the computer storage medium includes a program designed for performing the second aspect.

These aspects or other aspects in the embodiments of this application are clearer and more comprehensible in descriptions of the following embodiments.

BRIEF DESCRIPTION OF DRAWINGS

FIG. 4 shows another schematic block diagram of a positioning method according to an embodiment of this application;

FIG. 5 shows a schematic block diagram of a positioning apparatus according to an embodiment of this application;

DESCRIPTION OF EMBODIMENTS

The following describes technical solutions of this application with reference to accompanying drawings.

It should be understood that the embodiments of this application may be applied to network RTK, so that positioning service continuity can be ensured, and particularly, when a fast-moving mobile device performs cell crossing motion in the network RTK, continuous positioning of the mobile device may be ensured by using the technical solutions in the embodiments of this application. The embodiments of this application may be further applied to a mobile network. The network RTK is used for network positioning, and is mainly used for a navigation aspect.

In the network RTK, several (usually at least three) fixed observation stations (referred to as datum stations/reference stations) are evenly and sparsely arranged in a relatively wide area, so as to form a datum station network, and one or more of the datum stations are used as a reference, to provide network differential information for the mobile device in real time, so as to correct an error in the Global Navigation Satellite System (GNSS) of the mobile device, and implement high-precision positioning.

Currently, in a virtual reference station (VRS) technology in a network RTK technology, a measurement person can immediately start to implement high-precision dynamic RTK measurement once entering any place in a measurement area, so as to fundamentally improve operating efficiency and measurement quality. Therefore, a VRS construction wave is immediately raised in China upon emergence of a VRS. Respective VRS systems are established in a plurality of cities such as Beijing, Tianjin, Shanghai, Shenzhen, Chengdu, Tsingtao, Dongguan, and Suzhou. In addition to the survey field, the VRS system is popularized and applied to a meteorological aspect, an astronomical aspect, a navigation aspect, and other social function aspects.

Figure 1:
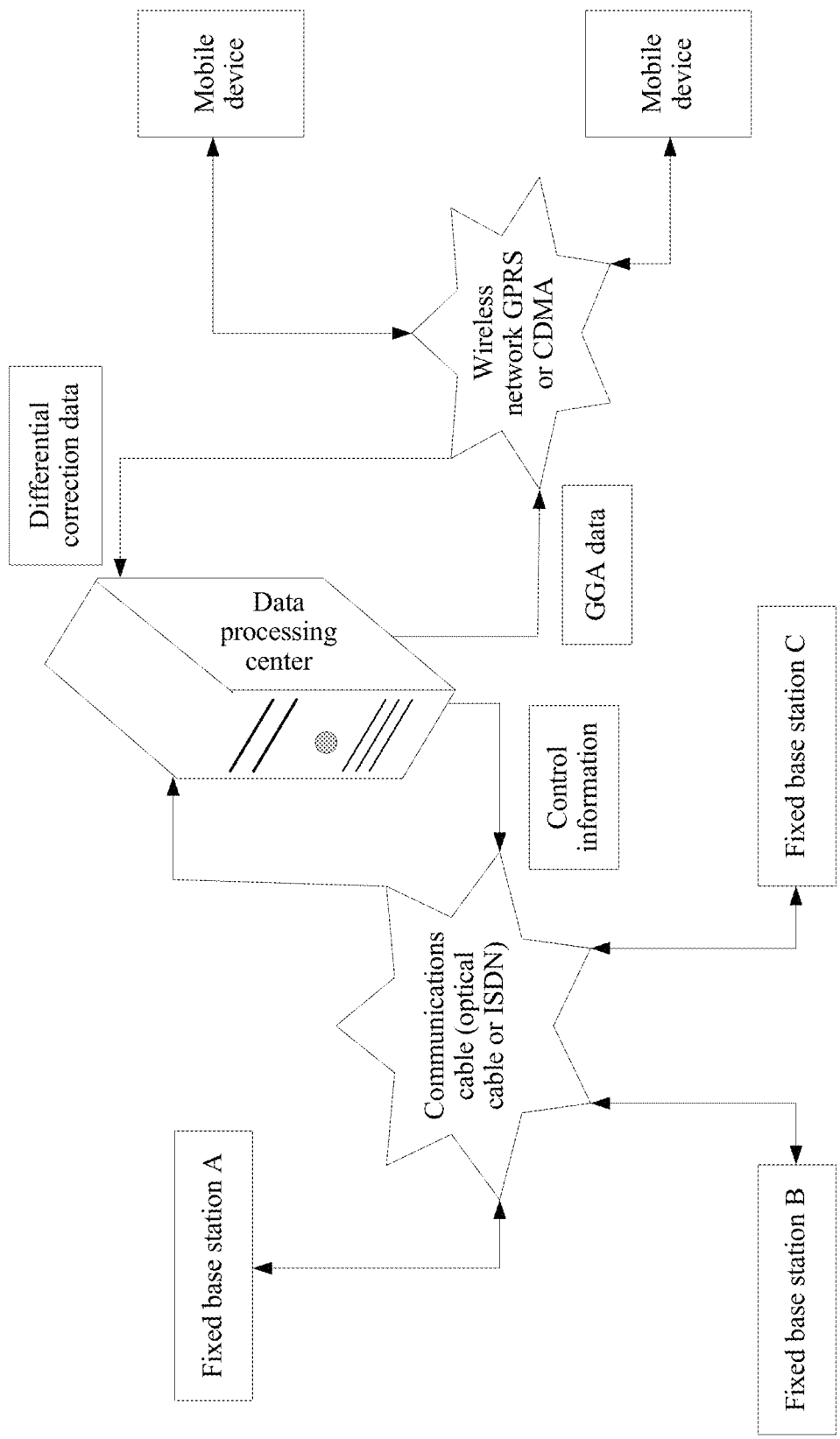
FIG. 1 shows an operating principle diagram of a VRS.

In the VRS technology, a specified quantity of reference stations are first deployed in a specified area or in a city. The reference stations receive a satellite signal, and transfer information to a service center. A mobile device first sends position information of a receiver to the service center. The service center selects information from several neighboring reference stations at relatively good positions based on a position of the mobile device, generates, near the mobile device, a virtual reference station that does not physically exist, and sends correction data of the virtual reference station to the mobile device. The mobile device can obtain coordinates with centimeter-level precision after receiving International Radio Technical Commission for Maritime services (RTCM) differential correction data sent by a VRS control center. FIG. 1 shows an operating principle diagram of a VRS. As shown in FIG. 1, the VRS system mainly includes four parts: a service center, a fixed datum station, a mobile device, and a data link.

The service center is a core part of the entire VRS system. The service center needs to receive GPS observation data from all fixed datum stations and coarse position information from the mobile device, and further needs to send, to the mobile device, virtual observation information such as calculated differential correction information.

The fixed datum station is a data source of the entire VRS system, and needs to continuously capture, track, and record satellite signals at a reference point with known coordinates by using the receiver.

The mobile device is an end user of the VRS system, and obtains the differential correction information from the service center in real time in a VRS network coverage area by using the receiver, so as to implement RTK positioning.

The data link is a data communication channel and includes two parts: a wired connection and a wireless connection. The datum station and the service center exchange a large data amount, and are usually connected through the wired connection by using a cable, for example, an optical cable or an Integrated Services Digital Network (ISDN). The mobile device has strong mobility, and is connected to the service center through the wireless connection: Global System for Mobile Communications (GSM), Code Division Multiple Access (CDMA), or general packet radio service (GPRS).

To help understand the technical solutions in the embodiments of this application, the following briefly describes a VRS observation value generation principle.

A formula of generating an observation value of a virtual reference station is:

$$\varphi_{VRS} = \varphi_M + \frac{1}{\lambda}\Delta\rho_{M,VRS} + \Delta B_{(M,VRS),I} \qquad (1)$$

$\Delta B_{(M,VRS),I}$ in the foregoing formula (1) may be obtained according to the following formula (2):

$$\Delta B_{(M,VRS),I} = \nabla \Delta B_{(M,VRS),I} + \Delta B_{(M,VRS),model} \qquad (2)$$

In the formulas (1) and (2):

$\varphi_{VRS}$ is the carrier observation value of the virtual reference station;

$\varphi_M$ is a carrier observation value of a primary datum station;

$\lambda$ is a wavelength;

$\Delta$ is a single difference, and $\nabla\Delta$ is a double difference;

$\Delta\rho^{M,VRS}$ is a geometrical distance difference between the virtual reference station and the primary datum station;

$\Delta B_{(M,VRS),I}$ is an offset that is between the virtual reference station and the primary datum station and that is obtained through interpolation;

$\Delta B_{(M,VRS),model}$ is a model value of the offset between the virtual reference station and the primary datum station; and $\nabla\Delta B_{(M,VRS),I}$ is an offset that is between the virtual reference station and the primary datum station and that is obtained through interpolation.

In addition, a virtual reference station observation equation is:

$$\varphi_{VRS} = \frac{1}{\lambda}\rho - N_{VRS} \quad (3)$$

In the formula (3):

$\rho$ is a distance between a satellite and the earth; and $N_{VRS}$ is ambiguity of a virtual reference station.

It can be learned that a same variable $\varphi_{VRS}$ is on left sides of equal signs in the formula (1) and the formula (3). Therefore:

$$\varphi_{VRS} = \frac{1}{\lambda}\rho - N_{VRS} = \varphi_M + \frac{1}{\lambda}\Delta\rho_{M,VRS} + \Delta B_{(M,VRS),I} \quad (4)$$

An ambiguity parameter $N_{VRS}$ is moved to obtain:

$$\varphi_{VRS} + N_{VRS} = \varphi_M + \frac{1}{\lambda}\Delta\rho_{M,VRS} + \Delta B_{(M,VRS),I} + N_{VRS} \quad (5)$$

Because both $\Delta\rho^{M,VRS}$ and $\Delta B_{(M,VRS),I}$ are obtained through calculation, $\varphi_M$ is the observation value of the primary datum station, and no ambiguity exists in $\Delta\rho^{M,VRS}$ and $\Delta B_{(M,VRS),I}$, and $\varphi_M$, $N_{VRS}$ on the right side of an equal sign in the formula (5) may be considered as ambiguity $N_M$ of the primary datum station. Therefore, the formula (5) may be rewritten into the following formula:

$$\varphi_{VRS} + N_{VRS} = \varphi_M + \frac{1}{\lambda}\Delta\rho_{M,VRS} + \Delta B_{(M,VRS),I} + N_M \quad (6)$$

Therefore, it can be obtained from the foregoing analysis that the ambiguity of the primary datum station is the ambiguity of the virtual reference station. A virtual station observation value for positioning may be obtained by modifying the observation value of the primary datum station.

Figure 2:
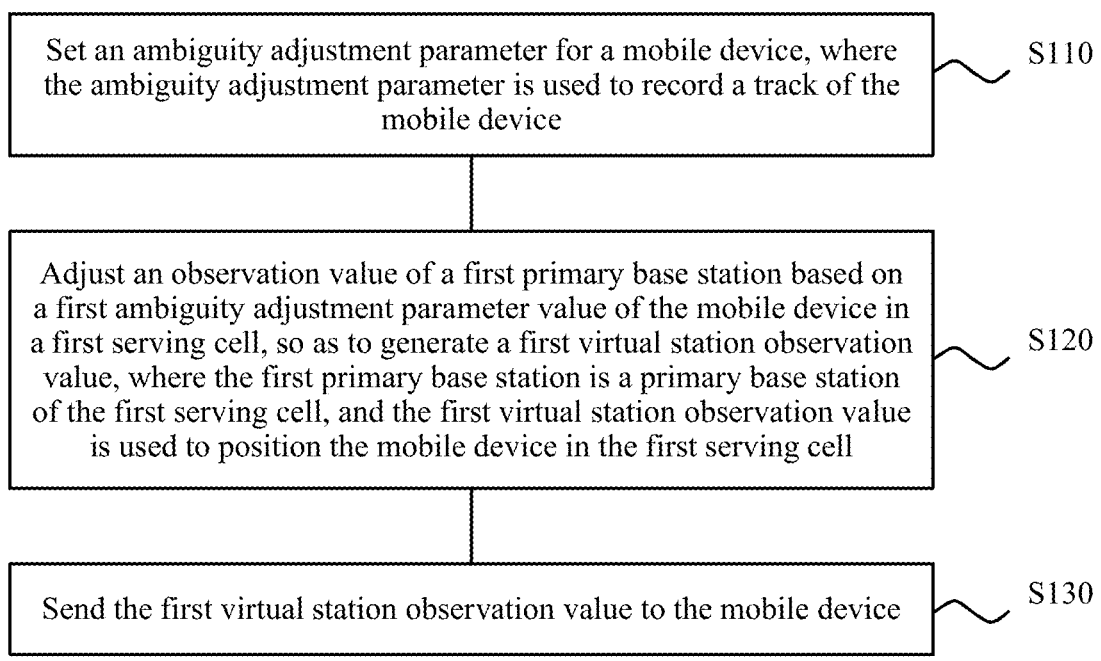
FIG. 2 shows a schematic block diagram of a positioning method according to an embodiment of this application.

FIG. 2 shows a schematic block diagram of a positioning method 100 according to an embodiment of this application. As shown in FIG. 2, the method may be performed by a service center, and may be specifically performed by a data processing center. The method 100 includes the following steps:

S110. Set an ambiguity adjustment parameter for a mobile device, where the ambiguity adjustment parameter is used to record an ambiguity change status used to determine a virtual station observation value for the mobile device.

S120. Adjust an observation value of a first primary datum station based on a first ambiguity adjustment parameter of the mobile device in a first serving cell, so as to generate a first virtual station observation value, where the first primary datum station is a primary datum station of the first serving cell, and the first virtual station observation value is used to position the mobile device in the first serving cell.

S130. Send the first virtual station observation value to the mobile device.

It can be learned from the foregoing analysis that a virtual station observation value for positioning the mobile device is mainly obtained by modifying an observation value of a primary datum station. In this embodiment of this application, the ambiguity adjustment parameter is set for the mobile device, and the ambiguity adjustment parameter may be associated with one motion process of the mobile device (in other words, the ambiguity adjustment parameter is valid in one motion process), so as to facilitate management of the virtual station observation value required to position the mobile device, and ensure positioning service continuity of the mobile device.

Optionally, before the adjusting an observation value of a first primary datum station based on a first ambiguity adjustment parameter of the mobile device in a first serving cell, so as to generate a first virtual station observation value, the method further includes: determining that the first primary datum station that provides a positioning service for the mobile device is the first primary datum station, where the first primary datum station is the first primary datum station of a network accessed by the mobile device; and determining that the first ambiguity adjustment parameter is an initial value.

Specifically, a primary datum station of a network first accessed by the mobile device after the mobile device is delivered may be used as the first primary datum station, or a primary datum station of a network accessed again by the mobile device from a disconnected state may be used as the first primary datum station. The disconnected state may indicate that the mobile device does not need to be positioned after accessing a network, and the mobile device is disconnected from a datum station network to reduce overheads of the mobile device. The initial value may be a value preset based on experience, and may be 0, or may not be 0. This is not limited in this embodiment of this application.

It should be understood that a virtual station observation value sent by the service center to the mobile device may be carried in a packet. The packet may include a current virtual station observation value, and may further include a geographic coverage area of a current cell. If the service center predicts that cell handover is to be performed for the mobile device, a virtual station observation value of a target cell is further broadcast. A quantity of target cells is not limited, and the packet may further carry other information. This is not limited in this embodiment of this application.

Optionally, in this embodiment of this application, before the adjusting an observation value of a first primary datum station based on a first ambiguity adjustment parameter of the mobile device in a first serving cell, so as to generate a first virtual station observation value, the method further includes: determining that a primary datum station that provides a positioning service for the mobile device switches from a second primary datum station to the first primary datum station; obtaining an ambiguity difference between the first primary datum station and the second primary datum station; and updating the ambiguity adjustment parameter to the first ambiguity adjustment parameter based on the ambiguity difference, where the first ambiguity adjustment parameter is obtained by summing up a second ambiguity adjustment parameter of the mobile device in a second serving cell and the ambiguity difference, and the second primary datum station is a primary datum station of the second serving cell.

With rapid development of intelligent driving technologies, it can be foreseen that network RTK is widely used for high-precision positioning navigation of intelligent vehicles in the future. However, such mobile devices relatively frequently cross different cells because the mobile devices have a relatively high motion speed and a large motion range. Because cells have different primary datum stations, different ambiguity references are used to position the mobile device. When a primary station changes, initialization needs to be performed for the mobile device, and positioning of the mobile device is interrupted. Therefore, to ensure that the mobile device may be continuously positioned, a same ambiguity reference is required to position the mobile device in two adjacent cells. A key to resolve a roaming problem is to resolve a problem that different ambiguity references are used to position the mobile device during cell crossing.

Specifically, when the mobile device starts to move, an ambiguity adjustment parameter may be set for the mobile device. Ambiguity adjustment parameters of the mobile device in different cells are obtained by accumulating all ambiguity differences during previous cell crossing after the mobile device starts to move. The mobile device may periodically send current position information and position information at a next moment to the service center, so that the service center determines, based on the two received pieces of position information, whether the mobile device is performing cell crossing motion. If the mobile device is performing cell crossing motion, an ambiguity difference between primary datum stations of two adjacent cells may be calculated, and is added to an ambiguity adjustment parameter of the mobile device in a current cell. Further, the service center may determine, based on a calculated ambiguity adjustment parameter of the mobile device in a next cell, a virtual station observation value used to position the mobile device in the next cell, and send the determined virtual station observation value to the mobile device, so that the mobile device may be positioned based on the virtual station observation value.

An observation value that is of a primary datum station and that is used to position the mobile device in the next cell is modified based on the ambiguity adjustment parameter obtained through accumulation that is started when the mobile device starts to move, so as to generate the virtual station observation value that is used for positioning. This can resolve a problem that positioning of the mobile device is interrupted during cell crossing, and this is simple and easily implemented.

It should be understood that in this embodiment of this application, motion that the mobile device moves from the first serving cell to the second serving cell may be initial motion, or may be continuous motion, which means that the mobile device moves from a third serving cell to the first serving cell, and then moves from the first serving cell to the second serving cell. This is not limited in this application.

It should be further understood that if the motion is initial motion, it can be learned from the foregoing formula (1) that the virtual station observation value used to provide a positioning service for the mobile device is derived from an observation value of a primary datum station of a cell in which the mobile device is located, and the observation value of the primary datum station includes ambiguity of the primary datum station. The service center modifies, based on an ambiguity difference between a current primary datum station and a next primary datum station, ambiguity used to position the mobile device in the next cell, so as to form an ambiguity adjustment parameter of the mobile device in the next cell in this embodiment of this application, and calculates, based on the ambiguity adjustment parameter in the next cell, the virtual station observation value for positioning. It can be learned that based on an ambiguity difference between two primary datum stations, ambiguity used to position the mobile device in the next cell and ambiguity used to position the mobile device in the current cell are related, so as to implement continuous positioning.

If the motion is continuous motion, it is assumed that the ambiguity adjustment parameter of the mobile device is n. If the mobile device first accesses a network in a first cell, moves from the first cell to a second cell, and moves from the second cell to a third cell, it is assumed that an ambiguity difference between a primary datum station of the second cell and a primary datum station of the first cell is $\Delta N_1$, an ambiguity difference between a primary datum station of the second cell and a primary datum station of the third cell is $\Delta N_2$. If an initial value of n is 0, an ambiguity adjustment parameter of the mobile device in the third cell is $n=\Delta N_1+\Delta N_2$.

Optionally, in this embodiment of this application, the determining that a primary datum station that provides a positioning service for the mobile device switches from a second primary datum station to the first primary datum station includes: receiving first position information that is of the mobile device at a current moment and that is sent by the mobile device and second position information that is of the mobile device at a first moment and that is determined and sent by the mobile device, where the first moment is after the current moment; and determining, based on the first position information and the second position information, that the primary datum station that provides the positioning service for the mobile device switches from the second primary datum station to the first primary datum station.

Specifically, when the mobile device moves in a cell, the mobile device may predict coordinates of the mobile device after a period of time (for example, 1 s) based on current coordinates and a current speed (the speed is a vector and includes a size and a direction) of the mobile device, and then the mobile device simultaneously sends the current coordinates and the predicted coordinates to the service center. The service center may determine, based on the two coordinates sent by the mobile device, whether a current position and a predicted position of the mobile device are located in one cell. If the current position and the predicted position are located in one cell, data used to provide the positioning service for the mobile device does not need to be changed. If the current position and the predicted position are not located in one cell, data needs to be further prepared for the mobile device. It can be learned that the mobile device independently predicts coordinates, increasing accuracy and flexibility.

Optionally, in this embodiment of this application, the determining that a primary datum station that provides a positioning service for the mobile device switches from a second primary datum station to the first primary datum station includes: receiving first position information that is of the mobile device at a current moment and that is sent by the mobile device and speed information and direction information that are of the mobile device at the current moment and that are sent by the mobile device; determining second position information of the mobile device at a first moment based on the first position information, the speed information, and the direction information, where the first moment is after the current moment; and determining, based on the first position information and the second position information, that the primary datum station that provides the positioning service for the mobile device switches from the second primary datum station to the first primary datum station.

Specifically, when the mobile device moves in a cell, the mobile device may send coordinates and a moving speed (the speed is a vector and includes a size and a direction) of the mobile device to the service center. The service center may predict a position of the mobile device after a time (for example, one minute) based on the coordinates and the moving speed of the mobile device. If the predicted position and a current position are located in one cell, data used to provide the positioning service for the mobile device does not need to be changed. If the predicted position and a current position are not located in one cell, data needs to be further prepared for the mobile device. It can be learned that this embodiment is usually applied to a mobile device that moves at a constant speed. Because the service center predicts a position of the mobile device based on current speed information sent by the mobile device, the service center is not clear about a speed change in a future period of time, and can only consider that the mobile device moves at a constant speed. Therefore, when a speed of the mobile device changes, an error exists in prediction of the service center. Consequently, prediction is not accurate.

Optionally, in this embodiment of this application, the obtaining a first ambiguity difference between the first primary datum station and the second primary datum station includes: obtaining the first ambiguity difference through vector calculation based on an ambiguity parameter of a known baseline in a datum station network, where the datum station network is a Delaunay triangulation network including a plurality of datum stations on a two-dimensional plane, and the known baseline forms a shortest path from the first primary datum station to the second primary datum station in the datum station network.

A person skilled in the art should understand that the baseline is a three-dimensional coordinate difference that is between GNSS receivers and that is calculated by using observation data collected by the receivers that perform simultaneous observation. The baseline is a GNSS relative positioning result. The baseline is an observation value during network adjustment in a GNSS network establishment process. Relative positioning is a positioning method for determining relative positions (a coordinate difference) of several receivers that synchronously track a same GNSS satellite signal. Relative positions of two points may be represented by using a baseline vector. In this embodiment of this application, a shortest baseline between primary datum stations of two cells that are before and after cell crossing is searched for. An ambiguity parameter of the baseline is known. Vector calculation is performed on a found known baseline, so that an ambiguity difference between two primary datum stations that are before and after cell crossing can be obtained. It should be understood that this embodiment of this application should not be limited to determining the ambiguity difference based on the shortest baseline, provided that the ambiguity difference between the two primary datum stations can be obtained.

Optionally, in this embodiment of this application, the method further includes: sending a second virtual station observation value to the mobile device, where the second virtual station observation value is generated by adjusting an observation value of the second primary datum station based on the second ambiguity adjustment parameter.

The service center sends, to the mobile device, two virtual station observation values used in two adjacent cells, so that the mobile device may switch a virtual station observation value more accurately.

Optionally, in a moving process, the mobile device may store and mark a virtual station observation value in each cell. When moving along a duplicate track, the mobile device may select corresponding virtual station observation values in different cells. Therefore, duplicate calculation may be reduced in the service center, and overheads of sending a virtual station observation value to the mobile device by the service center are reduced.

Figure 3:
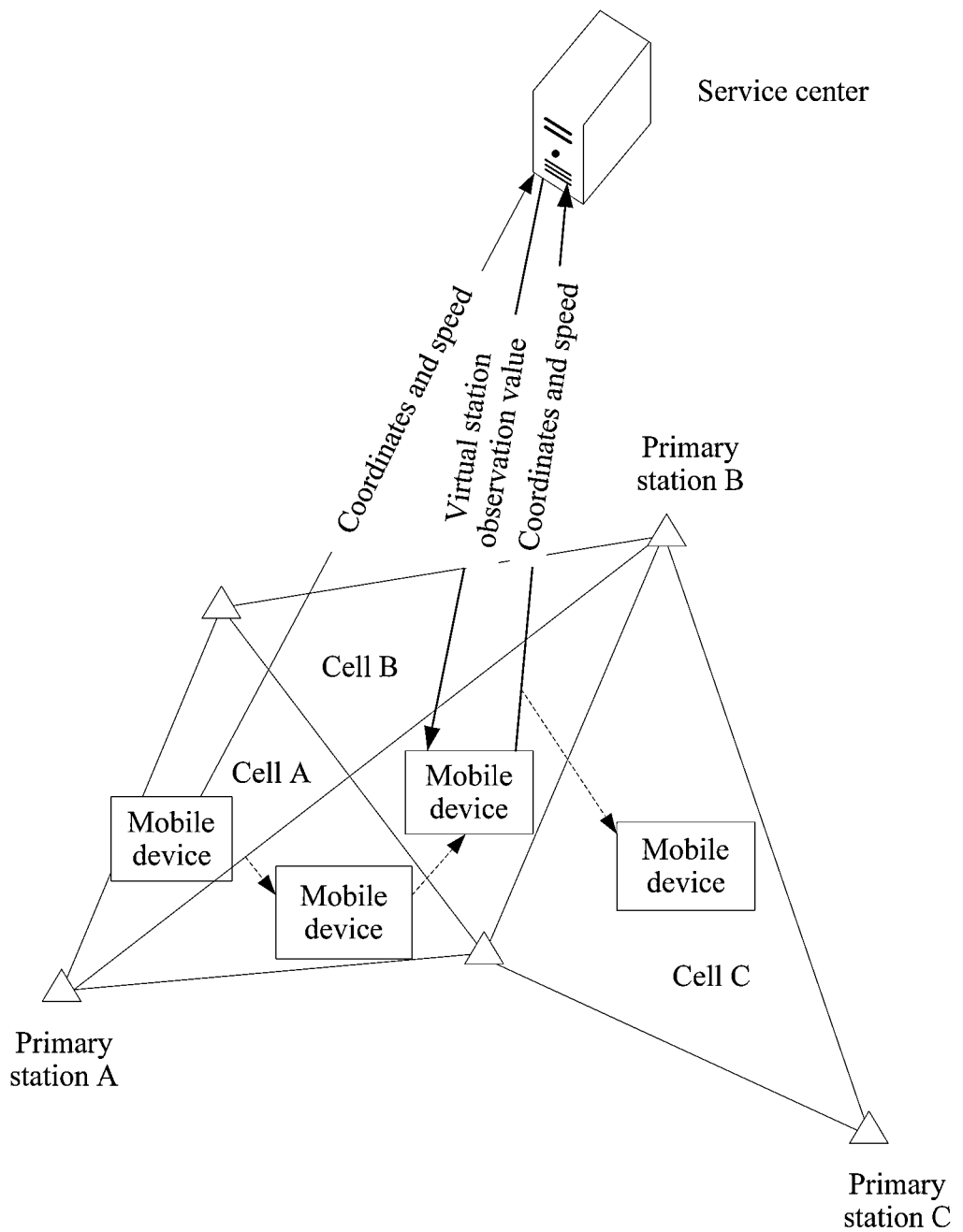
FIG. 3 shows a detailed diagram of a positioning method according to an embodiment of this application.

The following describes the positioning method in this embodiment of this application in detail with reference to FIG. 3. As shown in FIG. 3, when the mobile device starts to move from a cell A, an ambiguity adjustment parameter n is set for the mobile device, and an initial value is 0. The mobile device may send current coordinates of the mobile device and a current moving speed of the mobile device to the service center. When the service center determines that the mobile device needs to cross to a cell B, the service center may obtain, through calculation, that an ambiguity difference of the two cells is $\Delta N_{A,B}$. The service center may obtain, through calculation, that an ambiguity adjustment parameter of the mobile device in the cell B is $n=\Delta N_{A,B}$, and adjust an observation value of a primary datum station in the cell B, to generate a virtual station observation value. Therefore, when the mobile device moves to the cell B, the mobile device may position the mobile device based on the virtual station observation value sent by the service center. When the service center determines that the mobile device continues to move from the cell B to a cell C, the service center may calculate an ambiguity difference $\Delta N_{B,C}$ between the cell B and the cell C by using a similar method, further obtain, through calculation, that an ambiguity adjustment parameter of the mobile device in the cell C is $n=\Delta N_{A,B}+\Delta N_{B,C}$, and adjust an observation value of a primary datum station in the cell C, to generate a virtual station observation value. By analogy, if the mobile device further needs to move from the cell C to a cell D, $n=\Delta N_{A,B}+\Delta N_{B,C}+\Delta N_{C,D}$ may be used as an ambiguity adjustment parameter of the mobile device in the cell D.

FIG. 4 shows a schematic block diagram of a positioning service method 200 according to an embodiment of this application. As shown in FIG. 4, the method 200 may be performed by a mobile device, and may be specifically performed by a mobile terminal device. The method 200 includes the following steps:

S210. Receive a first virtual station observation value sent by a service center, where the first virtual station observation value is generated by adjusting an observation value of a first primary datum station based on a first ambiguity adjustment parameter of a mobile device in a first serving cell, and the first primary datum station is a primary datum station of the first serving cell.

S220. Position the mobile device based on the first virtual station observation value.

Therefore, according to the positioning method provided in this embodiment of this application, positioning is performed based on an observation value that is of a primary datum station and that is modified based on an ambiguity adjustment parameter, so that positioning continuity can be ensured.

Optionally, in this embodiment of this application, the first ambiguity adjustment parameter is obtained by summing up a second ambiguity adjustment parameter of the mobile device in a second serving cell and an ambiguity difference between the first primary datum station and a second primary datum station, the second primary datum station is a primary datum station of the second serving cell, and before the receiving a first virtual station observation value sent by a service center, the method further includes: sending first information to the service center, where the first information is used by the service center to determine that a primary datum station that provides a positioning service for the mobile device switches from the first primary datum station to the second primary datum station.

Information for determining switching of the primary datum station that provides the positioning service for the mobile device is sent to the service center, so that the service center modifies the observation value of the primary datum station based on ambiguity differences between primary datum stations of a plurality of cells that are before cell crossing. This can resolve a problem that positioning of the mobile device is interrupted during cell crossing, and this is simpler and more easily implemented in comparison with an entirety processing method.

Optionally, in this embodiment of this application, the first information includes first position information and second position information, and before the sending first information to the service center, the method further includes: obtaining the first position information of the mobile device at a current moment and speed information and direction information of the mobile device at the current moment; and determining the second position information of the mobile device at a first moment based on the first position information, the speed information, and the direction information, where the first moment is after the current moment. The mobile device independently predicts coordinates, increasing accuracy and flexibility.

Optionally, in this embodiment of this application, the first information includes first position information of the mobile device at a current moment and speed information and direction information of the mobile device at the current moment.

Optionally, in this embodiment of this application, the method further includes: receiving a second virtual station observation value sent by the service center, where the second virtual station observation value is obtained by adjusting an observation value of the second primary datum station based on the second ambiguity adjustment parameter; and when the mobile device moves from the second serving cell to the first serving cell, switching a virtual station observation value used to position the mobile device from the second virtual station observation value to the first virtual station observation value.

It should be understood that interaction between the mobile device and the service center, related characteristics, functions, and the like that are described from the perspective of the mobile device are corresponding to those described from the perspective of the service center. For brevity, details are not described herein again.

It should be further understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

With reference to FIG. 2 to FIG. 4, the foregoing describes in detail the positioning method according to the embodiments of this application. An apparatus embodiment of this application is provided below, and an apparatus may be configured to execute the method embodiments of this application. For details not disclosed in the apparatus embodiment of this application, refer to the method embodiments of this application.

FIG. 5 shows a schematic block diagram of a positioning apparatus 300 according to an embodiment of this application. As shown in FIG. 5, the apparatus 300 includes:

a setting unit 310, configured to set an ambiguity adjustment parameter for a mobile device, where the ambiguity adjustment parameter is used to record an ambiguity change status used to determine a virtual station observation value for the mobile device;

a generation unit 320, configured to adjust an observation value of a first primary datum station based on a first ambiguity adjustment parameter of the mobile device in a first serving cell, so as to generate a first virtual station observation value, where the first primary datum station is a primary datum station of the first serving cell, and the first virtual station observation value is used to position the mobile device in the first serving cell; and a sending unit 330, configured to send the first virtual station observation value to the mobile device.

Therefore, according to the positioning apparatus provided in this embodiment of this application, the ambiguity adjustment parameter is set for the mobile device, and observation values of primary datum stations of different cells are adjusted based on ambiguity adjustment parameters of the mobile device in different cells, so that positioning service continuity can be ensured.

Optionally, in this embodiment of this application, the apparatus 300 further includes:

a first determining unit 340, configured to determine that the first primary datum station that provides a positioning service for the mobile device is the first primary datum station, where the first primary datum station is the first primary datum station of a network accessed by the mobile device, where the first determining unit 340 is further configured to determine that the first ambiguity adjustment parameter is an initial value.

Optionally, in this embodiment of this application, the apparatus 300 further includes: a second determining unit 350, configured to determine that a primary datum station that provides a positioning service for the mobile device switches from a second primary datum station to the first primary datum station; an obtaining unit 360, configured to obtain an ambiguity difference between the first primary datum station and the second primary datum station; and an updating unit 370, configured to update the ambiguity adjustment parameter to the first ambiguity adjustment parameter based on the ambiguity difference, where the first ambiguity adjustment parameter is obtained by summing up a second ambiguity adjustment parameter of the mobile device in a second serving cell and the ambiguity difference, and the second primary datum station is a primary datum station of the second serving cell.

Optionally, in this embodiment of this application, the second determining unit 350 is specifically configured to: receive first position information that is of the mobile device at a current moment and that is sent by the mobile device and second position information that is of the mobile device at a first moment and that is determined and sent by the mobile device, where the first moment is after the current moment; and determine, based on the first position information and the second position information, that the primary datum station that provides the positioning service for the mobile device switches from the second primary datum station to the first primary datum station.

Optionally, in this embodiment of this application, the second determining unit 350 is specifically configured to: receive first position information that is of the mobile device at a current moment and that is sent by the mobile device and speed information and direction information that are of the mobile device at the current moment and that are sent by the mobile device; determine second position information of the mobile device at a first moment based on the first position information, the speed information, and the direction information, where the first moment is after the current moment; and determine, based on the first position information and the second position information, that the primary datum station that provides the positioning service for the mobile device switches from the second primary datum station to the first primary datum station.

Optionally, in this embodiment of this application, the obtaining unit 360 is specifically configured to obtain the first ambiguity difference through vector calculation based on an ambiguity parameter of a known baseline in a datum station network, where the datum station network is a Delaunay triangulation network including a plurality of datum stations on a two-dimensional plane, and the known baseline forms a shortest path from the first primary datum station to the second primary datum station in the datum station network.

Optionally, in this embodiment of this application, the sending unit 330 is further configured to send a second virtual station observation value to the mobile device, where the second virtual station observation value is generated by adjusting an observation value of the second primary datum station based on the second ambiguity adjustment parameter.

Therefore, according to the positioning apparatus provided in this embodiment of this application, an observation value that is of a primary datum station and that is used to position the mobile device in a next cell is modified by using an ambiguity adjustment parameter obtained by summing up ambiguity differences between a plurality of continuous cells that are before the mobile device crosses to the next cell, so as to ensure continuous positioning when the mobile device frequently crosses cells.

It should be understood that the positioning apparatus 300 according to this embodiment of this application may be corresponding to an execution body of the positioning method 100 according to the embodiments of this application, and the foregoing and other operations and/or functions of the modules in the apparatus 300 are respectively intended to implement corresponding procedures of the methods in FIG. 2 and FIG. 3. For brevity, details are not described herein again.

Figure 6:
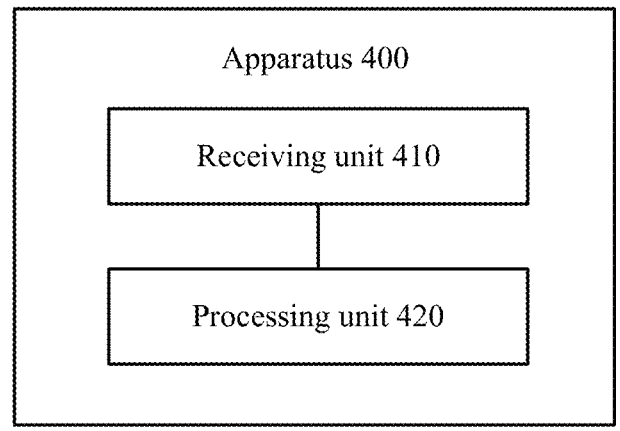
FIG. 6 shows another schematic block diagram of a positioning apparatus according to an embodiment of this application.

FIG. 6 shows a schematic block diagram of a positioning apparatus 400 according to an embodiment of this application. As shown in FIG. 6, the apparatus 400 includes:

a receiving unit 410, configured to receive a first virtual station observation value sent by a service center, where the first virtual station observation value is generated by adjusting an observation value of a first primary datum station based on a first ambiguity adjustment parameter of a mobile device in a first serving cell, and the first primary datum station is a primary datum station of the first serving cell; and a processing unit 420, configured to position the mobile device based on the first virtual station observation value.

Therefore, according to the positioning apparatus provided in this embodiment of this application, positioning is performed based on an observation value that is of a primary datum station and that is modified based on an ambiguity adjustment parameter, so that positioning continuity can be ensured.

Optionally, in this embodiment of this application, the first ambiguity adjustment parameter is obtained by summing up a second ambiguity adjustment parameter of the mobile device in a second serving cell and an ambiguity difference between the first primary datum station and a second primary datum station, the second primary datum station is a primary datum station of the second serving cell, and the apparatus 400 further includes: a sending unit 430, configured to send first information to the service center, where the first information is used by the service center to determine that a primary datum station that provides a positioning service for the mobile device switches from the first primary datum station to the second primary datum station.

Optionally, in this embodiment of this application, the first information includes first position information and second position information, and the apparatus 400 further includes: an obtaining unit 440, configured to obtain the first position information of the mobile device at a current moment and speed information and direction information of the mobile device at the current moment; and a determining unit 450, configured to determine the second position information of the mobile device at a first moment based on the first position information, the speed information, and the direction information, where the first moment is after the current moment.

Optionally, in this embodiment of this application, the first information includes first position information of the mobile device at a current moment and speed information and direction information of the mobile device at the current moment.

Optionally, in this embodiment of this application, the receiving unit 410 is further configured to receive a second virtual station observation value sent by the service center, where the second virtual station observation value is obtained by adjusting an observation value of the second primary datum station based on the second ambiguity adjustment parameter; and a switching unit 460, configured to: when the mobile device moves from the second serving cell to the first serving cell, switch a virtual station observation value used to position the mobile device from the second virtual station observation value to the first virtual station observation value.

Therefore, according to the positioning apparatus provided in this embodiment of this application, information for determining switching of the primary datum station that provides the positioning service for the mobile device is sent to the service center, so that the service center sends a modified virtual station observation value to the mobile device for positioning. This can resolve a problem that positioning of the mobile device is temporarily interrupted during cell crossing, and this is simple and easily implemented.

It should be understood that the positioning apparatus 400 according to this embodiment of this application may be corresponding to an execution body of the positioning method 200 according to the embodiments of this application, and the foregoing and other operations and/or functions of the modules in the apparatus 400 are respectively intended to implement corresponding procedures of the method in FIG. 4. For brevity, details are not described herein again.

Figure 7:
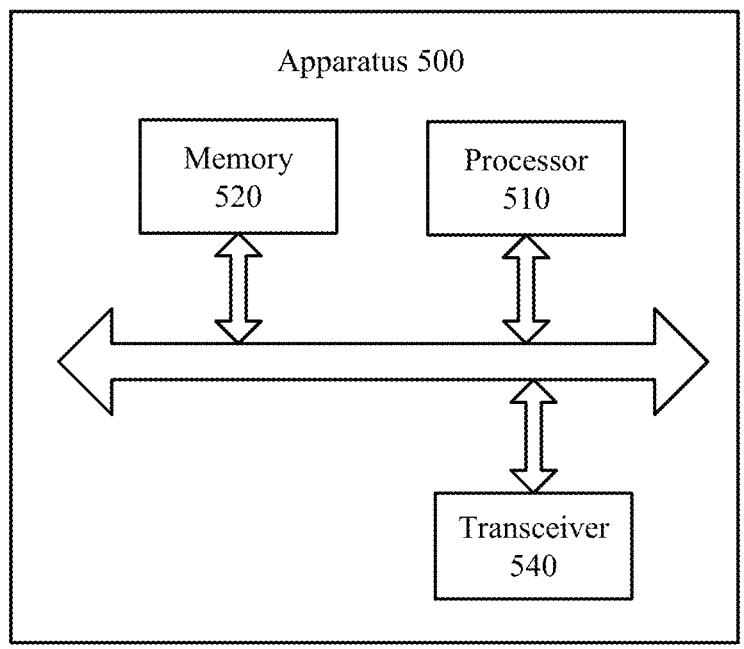
FIG. 7 shows still another schematic block diagram of a positioning apparatus according to an embodiment of this application.

As shown in FIG. 7, an embodiment of this application further provides a positioning apparatus 500, and the apparatus 500 includes: a processor 510, a memory 520, and a transceiver 540. The processor 510, the memory 520, and the transceiver 540 are connected by using communication connections. The memory 520 is configured to store an instruction. The processor 510 is configured to execute the instruction stored in the memory 520, so as to control the transceiver 540 to send a signal. The processor 510 is configured to: set an ambiguity adjustment parameter for a mobile device, where the ambiguity adjustment parameter is used to record an ambiguity change status used to determine a virtual station observation value for the mobile device; adjust an observation value of a first primary datum station based on a first ambiguity adjustment parameter of the mobile device in a first serving cell, so as to generate a first virtual station observation value, where the first primary datum station is a primary datum station of the first serving cell, and the first virtual station observation value is used to position the mobile device in the first serving cell; and send the first virtual station observation value to the mobile device.

Therefore, according to the apparatus for providing a positioning service for the mobile device in this embodiment of this application, the ambiguity adjustment parameter is set for the mobile device, and observation values of primary datum stations of different cells are adjusted based on ambiguity adjustment parameters of the mobile device in different cells, so that positioning service continuity can be ensured.

It should be understood that in this embodiment of this application, the processor 510 may be a central processing unit (CPU), or the processor 510 may be another general purpose processor, a digital signal processor, an application-specific integrated circuit, a field programmable gate array or another programmable logic device, a discrete gate or a transistor logic device, a discrete hardware component, or the like. The general purpose processor may be a microprocessor, or the processor may be any conventional processor or the like.

The memory 520 may include a read-only memory and a random access memory, and provides an instruction and data for the processor 510. A part of the memory 520 may further include a nonvolatile random access memory. For example, the memory 520 may further store information about a device type.

In an implementation process, the steps of the foregoing method may be completed by using a hardware integrated logic circuit in the processor 510 or an instruction in a form of software. The steps of the methods disclosed with reference to the embodiments of this application may be directly performed by a hardware processor, or may be performed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory 520. The processor 510 reads information from the memory 520, and completes the steps of the foregoing methods in combination with the hardware. To avoid repetition, details are not described herein again.

It should be understood that the positioning apparatus 500 according to this embodiment of this application may be corresponding to the service center and the apparatus 300 according to the embodiments of this application, and may be corresponding to an execution body of the method 100 according to the embodiments of this application. The foregoing and other operations and/or functions of the units in the apparatus 500 are respectively intended to implement corresponding procedures of the methods in FIG. 2 and FIG. 3. For brevity, details are not described herein again.

Figure 8:
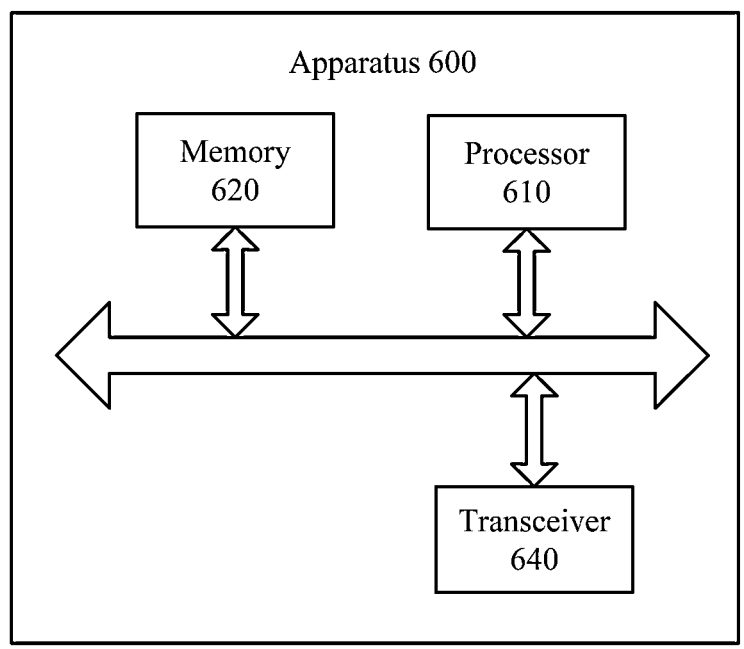
FIG. 8 shows yet another schematic block diagram of a positioning apparatus according to an embodiment of this application.

As shown in FIG. 8, an embodiment of this application further provides an apparatus 600 for providing a positioning service for a mobile device. The apparatus 600 includes: a processor 610, a memory 620, and a transceiver 640. The processor 610, the memory 620, and the transceiver 640 are connected by using communication connections. The memory 620 is configured to store an instruction. The processor 610 is configured to execute the instruction stored in the memory 620, so as to control the transceiver 640 to send a signal. The processor 610 is configured to: receive a first virtual station observation value sent by a service center, where the first virtual station observation value is generated by adjusting an observation value of a first primary datum station based on a first ambiguity adjustment parameter of a mobile device in a first serving cell, and the first primary datum station is a primary datum station of the first serving cell; and position the mobile device based on the first virtual station observation value.

Therefore, according to the positioning apparatus provided in this embodiment of this application, positioning is performed based on an observation value that is of a primary datum station and that is modified based on an ambiguity adjustment parameter, so that positioning continuity can be ensured.

It should be understood that in this embodiment of this application, the processor 610 may be a CPU, or the processor 610 may be another general purpose processor, a digital signal processor, an application-specific integrated circuit, a field programmable gate array or another programmable logic device, a discrete gate or a transistor logic device, a discrete hardware component, or the like. The general purpose processor may be a microprocessor, or the processor may be any conventional processor or the like.

The memory 620 may include a read-only memory and a random access memory, and provides an instruction and data to the processor 610. A part of the memory 620 may further include a nonvolatile random access memory. For example, the memory 620 may further store information about a device type.

In an implementation process, the steps of the foregoing method may be completed by using a hardware integrated logic circuit in the processor 610 or an instruction in a form of software. The steps of the methods disclosed with reference to the embodiments of this application may be directly performed by a hardware processor, or may be performed by using a combination of hardware and software modules in the processor. The software module may be located in a mature storage medium in the field, such as a random access memory, a flash memory, a read-only memory, a programmable read-only memory, an electrically-erasable programmable memory, or a register. The storage medium is located in the memory 620. The processor 610 reads information from the memory 620, and completes the steps of the foregoing methods in combination with the hardware. To avoid repetition, details are not described herein again.

It should be understood that the positioning apparatus 600 according to this embodiment of this application may be corresponding to the mobile device and the apparatus 400 according to the embodiments of this application, and may be corresponding to an execution body of the method 200 according to the embodiments of this application. The foregoing and other operations and/or functions of the units in the apparatus 600 are respectively intended to implement corresponding procedures of the method in FIG. 4. For brevity, details are not described herein again.

It should be understood that in the embodiments of this application, "B corresponding to A" indicates that B is associated with A, and B may be determined based on A. However, it should further be understood that determining B based on A does not mean that B is determined based on A only; in other words, B may also be determined based on A and/or other information.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example based on functions. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely an example. For example, the unit division is merely logical function division and may be other division in actual implementation. For example, a plurality of units or components may be combined or integrated into another system. In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any equivalent modifications or replacement readily figured out by a person skilled in the art within the technical scope disclosed in this application shall fall within the protection scope of this application.

What is claimed is:

1. A positioning method for adjusting positioning carried out by a service center, comprising:
setting an ambiguity adjustment parameter for a mobile device, wherein the ambiguity adjustment parameter is used to record an ambiguity change status used to determine a virtual station observation value of a virtual reference station for the mobile device, wherein the ambiguity adjustment parameter is expressed as: $N_{VRS}=1/\lambda\rho-\varphi_{VRS}$, wherein $N_{VRS}$ is ambiguity of the virtual reference station, $\lambda$ is a wavelength, $\rho$ is a distance between a satellite and Earth, and $\varphi_{VRS}$ is a carrier observation value of the virtual reference station;
determining that a primary datum station that provides a positioning service for the mobile device switches from a second primary datum station to a first primary datum station, wherein the first primary datum station is a primary datum station of a first serving cell;
obtaining an ambiguity difference between the first primary datum station and the second primary datum station;
updating the ambiguity adjustment parameter to a first ambiguity adjustment parameter based on the ambiguity difference, wherein the first ambiguity adjustment parameter is obtained by summing a second ambiguity adjustment parameter of the mobile device in a second serving cell and the ambiguity difference, and the second primary datum station is a primary datum station of the second serving cell;
adjusting an observation value of the first primary datum station based on a first ambiguity adjustment parameter of the mobile device in the first serving cell to generate a first virtual station observation value, the observation value obtained by the first primary datum station based on a satellite signal received by the first primary datum station, and the first virtual station observation value is used when a position of the mobile device in the first serving cell is determined using a network real time kinematic positioning process; and
sending the first virtual station observation value to the mobile device.

2. The method according to claim 1, wherein before the adjusting the observation value of the first primary datum station based on the first ambiguity adjustment parameter of the mobile device in the first serving cell, to generate the first virtual station observation value, the method further comprises:
determining that the first primary datum station that provides a positioning service for the mobile device is the first primary datum station, wherein the first primary datum station is the first primary datum station of a network accessed by the mobile device; and
determining that the first ambiguity adjustment parameter is an initial value.

3. The method according to claim 1, wherein the determining that the primary datum station that provides the positioning service for the mobile device switches from the second primary datum station to the first primary datum station comprises:
receiving first position information of the mobile device at a current moment sent by the mobile device and second position information of the mobile device at a first moment determined and sent by the mobile device, wherein the first moment is after the current moment; and determining, based on the first position information and the second position information, that the primary datum station that provides the positioning service for the mobile device switches from the second primary datum station to the first primary datum station.

4. The method according to claim 1, wherein the determining that the primary datum station that provides the positioning service for the mobile device switches from the second primary datum station to the first primary datum station comprises:

receiving first position information of the mobile device at a current moment sent by the mobile device and speed information and direction information of the mobile device at the current moment sent by the mobile device;

determining second position information of the mobile device at a first moment based on the first position information, the speed information, and the direction information, wherein the first moment is after the current moment; and determining, based on the first position information and the second position information, that the primary datum station that provides the positioning service for the mobile device switches from the second primary datum station to the first primary datum station.

5. The method according to claim 1, wherein the obtaining the ambiguity difference between the first primary datum station and the second primary datum station comprises:

obtaining the ambiguity difference through vector calculation based on an ambiguity parameter of a known baseline in a datum station network, wherein the datum station network is a Delaunay triangulation network comprising a plurality of datum stations on a two-dimensional plane, and the known baseline forms a shortest path from the first primary datum station to the second primary datum station in the datum station network.

6. The method according to claim 1, wherein the method further comprises:

sending a second virtual station observation value to the mobile device, wherein the second virtual station observation value is generated by adjusting an observation value of the second primary datum station based on the second ambiguity adjustment parameter.

7. A positioning apparatus for adjusting positioning carried out by a service center, comprising:

a memory storing program instructions; and a processor, coupled with the memory, configured to invoke the program instructions to perform operations, comprising:

setting an ambiguity adjustment parameter for a mobile device, wherein the ambiguity adjustment parameter is used to record an ambiguity change status used to determine a virtual station observation value of a virtual reference station for the mobile device, wherein the ambiguity adjustment parameter is expressed as: $N_{VRS}=1/\lambda\rho-\varphi_{VRS}$, wherein $N_{VRS}$ is ambiguity of the virtual reference station, $\lambda$ is a wavelength, $\rho$ is a distance between a satellite and Earth, and $\varphi_{VRS}$ is a carrier observation value of the virtual reference station;

determining that a primary datum station that provides a positioning service for the mobile device switches from a second primary datum station to a first primary datum station, wherein the first primary datum station is a primary datum station of a first serving cell;

obtaining an ambiguity difference between the first primary datum station and the second primary datum station;

updating the ambiguity adjustment parameter to a first ambiguity adjustment parameter based on the ambiguity difference, wherein the first ambiguity adjustment parameter is obtained by summing a second ambiguity adjustment parameter of the mobile device in a second serving cell and the ambiguity difference, and the second primary datum station is a primary datum station of the second serving cell;

adjusting an observation value of the first primary datum station based on a first ambiguity adjustment parameter of the mobile device in the first serving cell to generate a first virtual station observation value, the observation value obtained by the first primary datum station based on a satellite signal received by the first primary datum station, and the first virtual station observation value is used when a position of the mobile device in the first serving cell is determined using a network real time kinematic positioning process; and sending the first virtual station observation value to the mobile device.

8. The apparatus according to claim 7, wherein the processor is configured to invoke the program instructions to further perform operations, comprising:

determining that the first primary datum station that provides a positioning service for the mobile device is the first primary datum station, wherein the first primary datum station is the first primary datum station of a network accessed by the mobile device; and determining that the first ambiguity adjustment parameter is an initial value.

9. The apparatus according to claim 7, wherein the processor is configured to invoke the program instructions to further perform operations, comprising:

receiving first position information of the mobile device at a current moment sent by the mobile device and second position information of the mobile device at a first moment determined and sent by the mobile device, wherein the first moment is after the current moment; and determining, based on the first position information and the second position information, that the primary datum station that provides the positioning service for the mobile device switches from the second primary datum station to the first primary datum station.

10. The apparatus according to claim 7, wherein the processor is configured to invoke the program instructions to further perform operations, comprising:

receiving first position information of the mobile device at a current moment sent by the mobile device and speed information and direction information that are of the mobile device at the current moment sent by the mobile device;

determining second position information of the mobile device at a first moment based on the first position information, the speed information, and the direction information, wherein the first moment is after the current moment; and determining, based on the first position information and the second position information, that the primary datum station that provides the positioning service for the mobile device switches from the second primary datum station to the first primary datum station.

11. The apparatus according to claim 7, wherein the processor is configured to invoke the program instructions to further perform operations, comprising:

obtaining the ambiguity difference through vector calculation based on an ambiguity parameter of a known baseline in a datum station network, wherein the datum station network is a Delaunay triangulation network comprising a plurality of datum stations on a two-dimensional plane, and the known baseline forms a shortest path from the first primary datum station to the second primary datum station in the datum station network.

12. The apparatus according to claim 7, wherein the processor is configured to invoke the program instructions to further perform operations, comprising:

sending a second virtual station observation value to the mobile device, wherein the second virtual station observation value is generated by adjusting an observation value of the second primary datum station based on the second ambiguity adjustment parameter.

13. A non-transitory computer-readable storage medium, wherein the computer-readable medium stores program code to be executed by a device, and when the program code is executed by the device the devise is configured to perform operations for adjusting positioning carried out by a service center, the operations comprising:

setting an ambiguity adjustment parameter for a mobile device, wherein the ambiguity adjustment parameter is used to record an ambiguity change status used to determine a virtual station observation value of a virtual reference station for the mobile device, wherein the ambiguity adjustment parameter is expressed as: $N_{VRS}=1/\mu\rho-\varphi_{VRS}$, wherein $N_{VRS}$ is ambiguity of the virtual reference station, $\lambda$ is a wavelength, $\rho$ is a distance between a satellite and Earth, and $\varphi_{VRS}$ is a carrier observation value of the virtual reference station;

determining that a primary datum station that provides a positioning service for the mobile device switches from a second primary datum station to a first primary datum station, wherein the first primary datum station is a primary datum station of a first serving cell;

obtaining an ambiguity difference between the first primary datum station and the second primary datum station;

updating the ambiguity adjustment parameter to a first ambiguity adjustment parameter based on the ambiguity difference, wherein the first ambiguity adjustment parameter is obtained by summing a second ambiguity adjustment parameter of the mobile device in a second serving cell and the ambiguity difference, and the second primary datum station is a primary datum station of the second serving cell;

adjusting an observation value of the first primary datum station based on a first ambiguity adjustment parameter of the mobile device in the first serving cell to generate a first virtual station observation value, the observation value obtained by the first primary datum station based on a satellite signal received by the first primary datum station, and the first virtual station observation value is used when a position of the mobile device in the first serving cell is determined using a network real time kinematic positioning process; and sending the first virtual station observation value to the mobile device.

* * * * *

UNITED STATES PATENT AND TRADEMARK OFFICE
CERTIFICATE OF CORRECTION

PATENT NO. : 12,216,218 B2  
APPLICATION NO. : 17/837605  
DATED : February 4, 2025  
INVENTOR(S) : Jingsong Huang Page 1 of 1

It is certified that error appears in the above-identified patent and that said Letters Patent is hereby corrected as shown below:

In the Claims

In Column 20, Claim 1, Line 15, delete "$N_{VRS} = 1 / \mu\rho - \varphi_{VRS}$" and insert -- $N_{VRS} = \frac{1}{\lambda}\rho - \varphi_{VRS}$ --.

In Column 21, Claim 7, Line 60, delete "$N_{VRS} = 1 / \mu\rho - \varphi_{VRS}$" and insert -- $N_{VRS} = \frac{1}{\lambda}\rho - \varphi_{VRS}$ --.

In Column 23, Claim 13, Line 33, delete "$N_{VRS} = 1 / \mu\rho - \varphi_{VRS}$" and insert -- $N_{VRS} = \frac{1}{\lambda}\rho - \varphi_{VRS}$ --.

Signed and Sealed this  
Third Day of June, 2025

Coke Morgan Stewart  
*Acting Director of the United States Patent and Trademark Office*